US012601429B2

(12) United States Patent
Joesten et al.

(10) Patent No.: US 12,601,429 B2
(45) Date of Patent: Apr. 14, 2026

(54) WEAR RING

(71) Applicant: ABB Schweiz AG, Baden (CH)

(72) Inventors: Bernd Joesten, Laatzen (DE); Slavko Markovic, Kloten (CH)

(73) Assignee: ABB Schweiz AG, Baden (CH)

( * ) Notice: Subject to any disclaimer, the term of this patent is extended or adjusted under 35 U.S.C. 154(b) by 67 days.

(21) Appl. No.: 18/473,596

(22) Filed: Sep. 25, 2023

(65) Prior Publication Data

US 2024/0011595 A1    Jan. 11, 2024

Related U.S. Application Data

(63) Continuation of application No. PCT/EP2022/057972, filed on Mar. 25, 2022.

(30) Foreign Application Priority Data

Mar. 26, 2021    (EP) .................................... 21165226

(51) Int. Cl.
    *F16L 25/00*         (2006.01)
    *F16L 33/26*         (2006.01)
    *F16L 57/06*         (2006.01)
(52) U.S. Cl.
    CPC ....... *F16L 25/0036* (2013.01); *F16L 25/0054* (2013.01); *F16L 33/26* (2013.01); *F16L 57/06* (2013.01)
(58) Field of Classification Search
    CPC .... F16L 33/26; F16L 25/0036; F16L 25/0054
    See application file for complete search history.

(56) References Cited

U.S. PATENT DOCUMENTS 4,674,775 A * 6/1987 Tajima ................ F16L 25/0036
                                          285/903
4,801,158 A * 1/1989 Gomi .................. F16L 25/0036
                                          285/55
(Continued)

FOREIGN PATENT DOCUMENTS

DE         8805482 U1      6/1988
DE        29814418 U1     10/1998
(Continued)

OTHER PUBLICATIONS

European Patent Office, International Search Report in International Patent Application No. PCT/EP2022/057972, 6 pp. (Jul. 5, 2022).
(Continued)

*Primary Examiner* — Matthew Troutman
*Assistant Examiner* — Fannie Kee
(74) *Attorney, Agent, or Firm* — Fitch Even Tabin & Flannery LLP

(57)         ABSTRACT

The invention relates to a wear ring (10) for mounting on a pipe, tube, cable or the like, more particularly on a corrugated pipe (14). The wear ring (10) comprises two ring halves (18a, 18b), which can be interconnected to form a ring (18), wherein a fastening structure (26), by structures of which the ring (18) can be fixed on the corrugated pipe (14), is provided on the ring halves (18a, 18b). The ring halves (18a, 18b) comprise connecting elements (22), by structures of which the ring halves can be interlockingly interconnected in an axial direction, and the fastening structure (26) is formed by at least one ring insert (26), which can be radially moved on the ring (18) and which can be locked on the ring (18) in a radially inner position in order to fix the ring (18) on the corrugated pipe (14).

15 Claims, 3 Drawing Sheets

(56)                    References Cited

U.S. PATENT DOCUMENTS

| | | | | |
|---|---|---|---|---|
| 5,072,972 | A * | 12/1991 | Justice | F16L 25/0036 |
| | | | | 285/903 |
| 5,458,380 | A * | 10/1995 | Kanao | F16L 25/0036 |
| | | | | 285/903 |
| 8,690,194 | B1 * | 4/2014 | Smith | F16L 25/0036 |
| | | | | 285/154.4 |
| 2007/0029795 | A1 * | 2/2007 | Moner | F16L 25/0036 |
| | | | | 285/245 |
| 2008/0042433 | A1 * | 2/2008 | Smith | F16L 25/0036 |
| | | | | 285/276 |
| 2018/0003322 | A1 * | 1/2018 | Treichel | F16L 25/0036 |
| 2020/0263816 | A1 * | 8/2020 | Yoshida | F16L 25/0036 |
| 2021/0172549 | A1 * | 6/2021 | Ivett | F16L 25/0036 |

FOREIGN PATENT DOCUMENTS

| | | | | | |
|---|---|---|---|---|---|
| DE | 29920972 | U1 | 4/2001 | | |
| DE | 202007012036 | U1 | 2/2009 | | |
| DE | 102013011819 | A1 | 1/2015 | | |
| EP | 0073892 | A1 | 3/1983 | | |
| EP | 1398555 | A1 | 3/2004 | | |
| KR | 101825354 | B1 * | 2/2018 | ......... | F16L 25/0036 |
| KR | 101869227 | B1 * | 6/2018 | ......... | F16L 25/0036 |
| KR | 101907984 | B1 * | 10/2018 | ......... | F16L 25/0036 |
| KR | 20220021146 | A * | 2/2022 | ......... | F16L 25/0036 |
| WO | WO-2011155436 | A1 * | 12/2011 | ......... | F16L 25/0036 |
| WO | WO-2022057982 | A1 * | 3/2022 | ......... | F16L 25/0036 |

OTHER PUBLICATIONS

European Patent Office, Written Opinion in International Patent Application No. PCT/EP2022/057972, 10 pp. (Jul. 5, 2022).

* cited by examiner

WEAR RING

CROSS-REFERENCE TO RELATED APPLICATIONS

The instant application claims priority to International Patent Application No. PCT/EP2022/057972, filed Mar. 25, 2022, and to European Patent Application No. 21165226.8, filed on Mar. 26, 2021, each of which is incorporated herein in its entirety by reference.

FIELD OF THE DISCLOSURE

The present disclosure generally relates to a wear ring for fitting to a pipe, hose, cable or the like, and in particular, to a corrugated pipe. The wear ring comprises two ring halves which can be connected to each other to form a ring, wherein a securing structure, with which the ring can be fixed to the corrugated pipe, is arranged on the ring halves.

BACKGROUND OF THE INVENTION

Wear rings are fitted at critical locations of a protective hose for cables on machines, in particular movable machine parts, in order to prevent damage to the protective hose itself by abrasion at such critical locations. Since the wear rings are arranged at critical locations, they can themselves become abraded.

EP 1 398 555 A1 discloses a wear ring which has two ring halves which are connected to each other via screws which are secured tangentially in the region of the abutting faces. In an axial direction of the wear ring, a structure which is in the form of ribs is arranged internally in a first region. Via these ribs, the wear ring is retained on the corrugated pipe after the ring halves are connected together. In a second region which adjoins the first region axially, a rotatably supported inner ring is arranged in the wear ring so that two corrugated pipes which are connected to each other in the region of the wear ring can be rotated relative to each other.

DE 298 14 418 U1 discloses a wear ring for a corrugated pipe, with which a cable guide of a robot is intended to be protected against wear. The wear ring has two ring halves, which are connected to each other via two tangentially introduced screws. Internally, the wear ring has a rib structure, with which the wear ring is fixed on the corrugated pipe in an axial direction. Each ring half is made from two different materials which are formed on one above the other in order to be able to establish a wear state so that damage is not caused to the robot by protruding screws of the wear ring after excessive wear.

DE 20 2007 012 036 U1 discloses a wear ring for corrugated pipes. The wear ring is formed from two ring halves which have internally a rib and groove structure in order to fix the wear ring in a mounted form on the corrugated pipe. The ring halves have externally a centrally arranged groove via which the ring halves are connected to each other by means of a cable tie which is arranged in the groove.

Because half-shells are currently produced with metal or metal-like screws, it may be the case that the abrasion occurs at precisely the location where the screw is positioned. Consequently, this results in the counter-member, such as, for example, an industrial robot or a metal fitting, becoming damaged and significant damage to surrounding devices resulting.

Furthermore, the precise positions of the wear ring are only defined afterwards, which requires re-positioning, which results in the wear ring having to be completely released and re-connected as a result of the design and the fastening with screws, cable ties, hook and loop closures or the like. This is usually time-consuming in a large number of wear rings.

BRIEF SUMMARY OF THE INVENTION

The embodiments in accordance with the present disclosure generally describe a wear ring with which damage to the surrounding structure can be avoided and with which the position on the corrugated pipe, pipe or cable can be changed in a short time. The embodiments described herein include ring halves have connection structures, with which they can be connected to each other in a positive-locking manner in an axial direction and the securing structure is formed by at least one ring insert which is radially movable on the ring and which can be locked in order to fix the ring to the corrugated pipe in a radially internal position on the ring.

Although the described embodiments are described herein with respect to a corrugated pipe, instead of a corrugated pipe a pipe, hose, cable or the like can also be used. In this invention, the axial direction is in relation to the ring and corresponds at the same time to the direction of the corrugated pipe which is received in the wear ring. The connection structures are particularly constructed in such a manner that assembly or release of the ring halves is possible only in the axial direction. In this case, the wear ring is directly assembled on the corrugated pipe. The positive-locking connection of the ring halves has the advantage in this case that no screws or other fastening devices by which the surrounding structures can be damaged, have to be used. The assembly is thereby significantly simplified because no additional tool is necessary for fastening.

As a result of the radial movement of the ring insert, the internal diameter of the wear ring is reduced to the extent that it is fixed on the corrugated pipe. Since the actual fixing of the ring on the corrugated pipe is consequently carried out by the ring insert, the ring can be moved on the corrugated pipe in an axial direction before being fixed by the ring inserts. The wear ring can thereby be re-positioned after the ring insert has been released. In order to release the wear ring on the corrugated pipe, consequently, only the ring insert still has to be released and brought into a radially external position. The ring consequently does not have to be disassembled any longer. A re-positioning of the wear ring is thereby possible within a short time.

BRIEF DESCRIPTION OF THE SEVERAL VIEWS OF THE DRAWING(S)

DETAILED DESCRIPTION OF THE INVENTION

Figure 1:
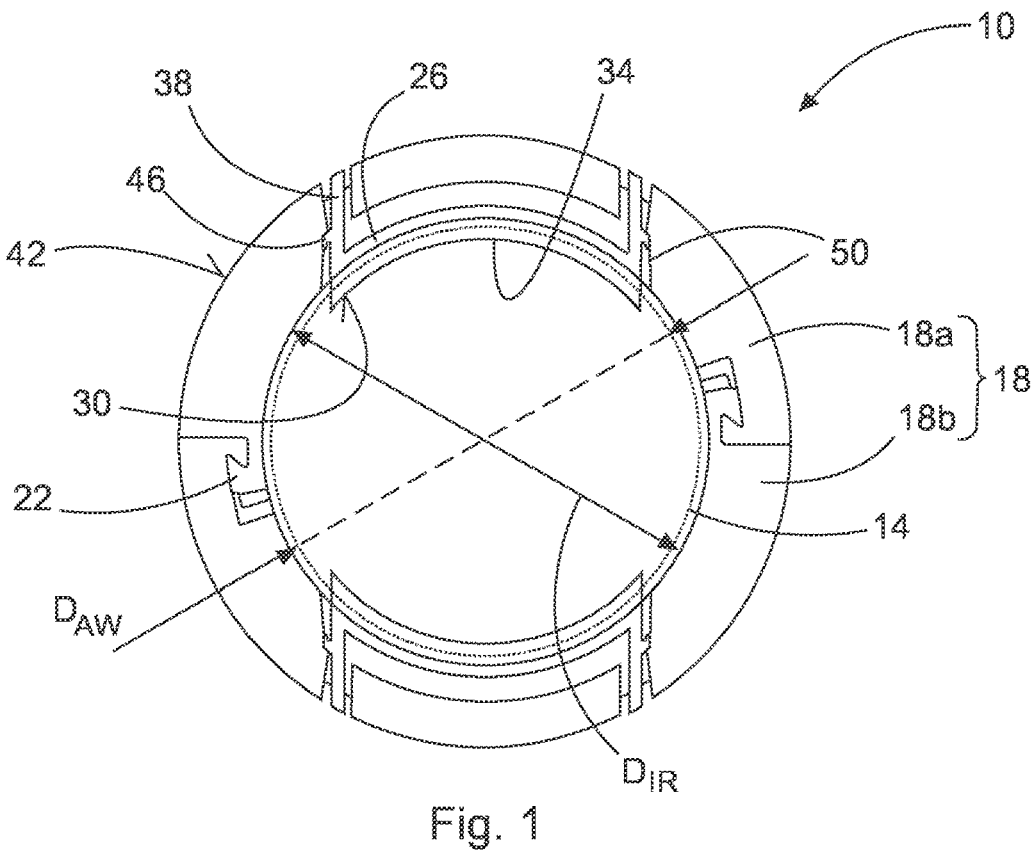
FIG. 1 is a sectioned view of an exemplary embodiment of a wear ring in a fixed position in accordance with the disclosure.

FIG. 1 shows a sectioned view of an exemplary embodiment of a wear ring 10 in a fixed position. In this position, the wear ring 10 is fixed on a corrugated pipe 14 which is shown with broken lines here and which the wear ring 10 surrounds. The wear ring 10 comprises two ring halves 18a, 18b which are connected to each other via connection structures 22 in a positive-locking manner in a radial direction. Both ring halves 18a, 18b together form a ring 18 in which two securing structures which are in the form of ring inserts 26 are arranged. In this exemplary embodiment, the ring inserts 26 form at an internal surface 30 a rib structure 34 which is engaged in a positive-locking manner with the corrugated structure of the corrugated pipe 14. In this exemplary embodiment, both the ring 18 and the ring inserts 26 are made from a plastics material.

In this case, an internal diameter $D_{IR}$ of the ring 18 is greater than an external diameter $D_{AW}$ of the corrugated pipe 14. The wear ring 10 is thereby retained on the corrugated pipe 14 by the ring inserts 26. Each ring insert 26 has two extensions 38 which terminate at a fixed position flush with an outer side 42 of the ring 18. Each extension 38 has a locking projection 46 which engages in the fixed position with a recess 50 in the ring half $\mathbf{18}_a$. The ring insert 26 is thereby locked in the fixed position.

Figure 2:
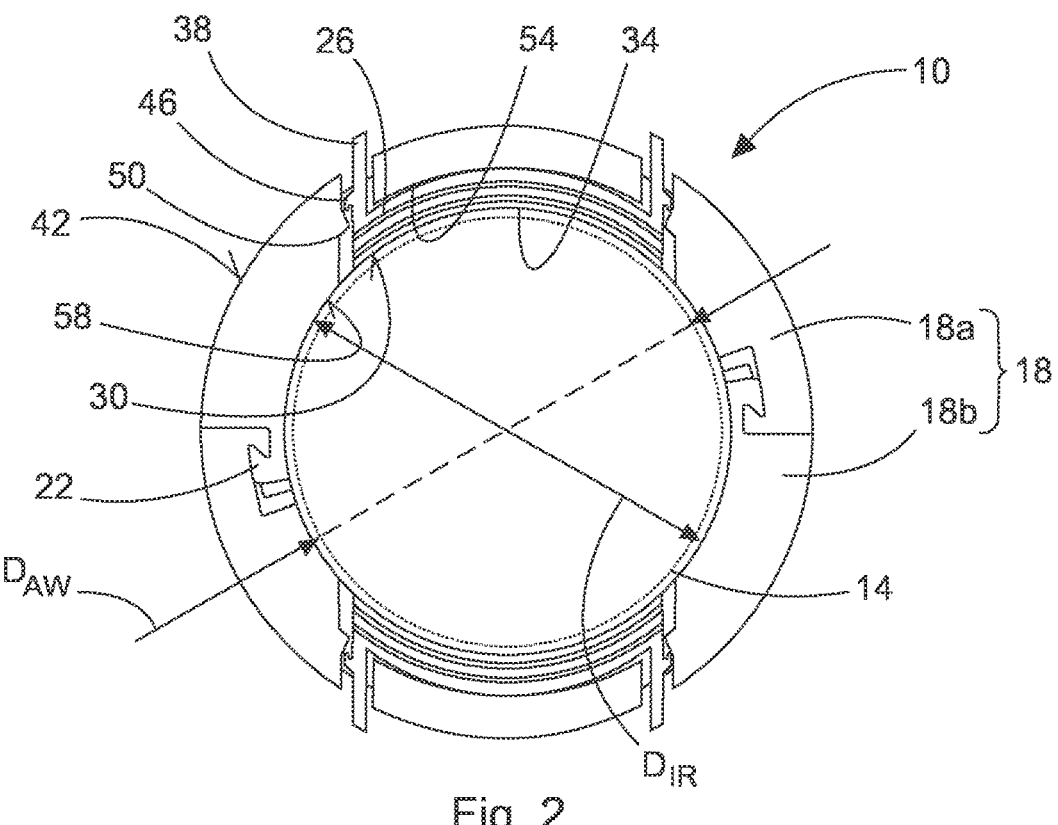
FIG. 2 is a sectioned view of the wear ring from FIG. 1 in a pre-assembly position.

FIG. 2 shows a sectioned view of the wear ring 10 from FIG. 1 in a pre-assembly position. In this position, the ring inserts 26 are arranged in internal indentations 54 of the ring halves 18a, 18b. In this case, the ring inserts 26 do not project beyond an inner side 58 of the ring 18. The wear ring 10 is thereby movable in an axial direction on the corrugated pipe 14. In the pre-assembly position, the extensions 38 project beyond the outer side 42 of the ring 18. The ring inserts 26 can thereby be brought into a fixed position by a radially inwardly directed force on the extensions 26.

Figure 3:
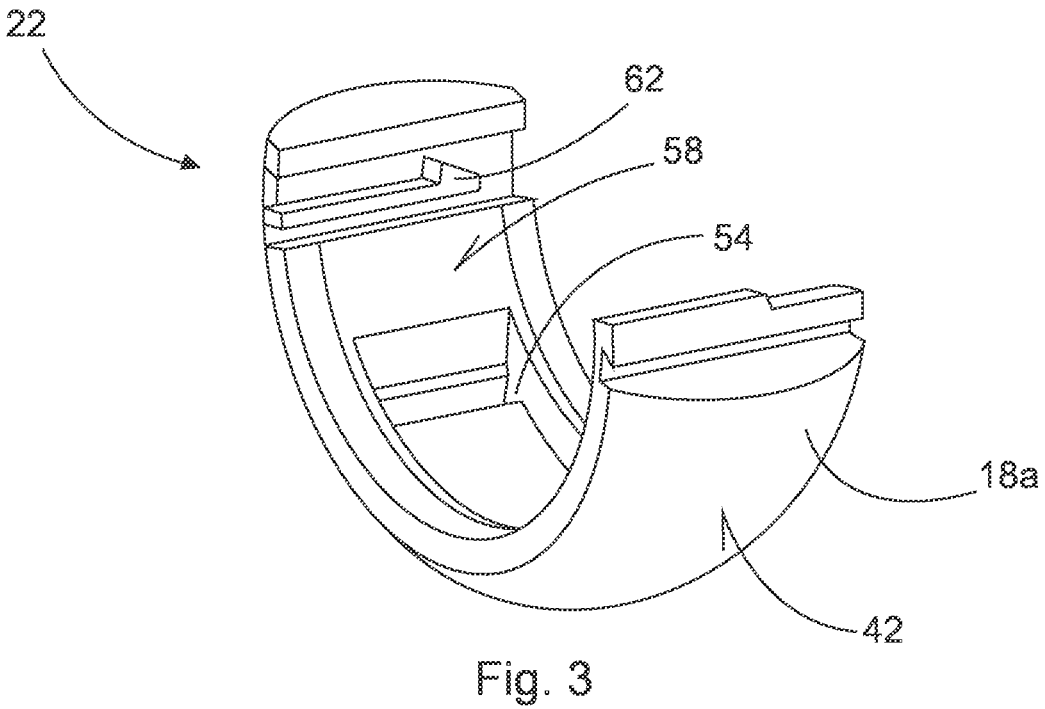
FIG. 3 is a perspective view of a ring half of the wear ring without any ring insert, in accordance with the disclosure.

A perspective view of a ring half 18a of the wear ring 10 is shown in FIG. 3. The ring half 18a is illustrated in this instance without any ring insert 26. Since the two ring halves 18a, 18b are constructed identically, only the ring half 18a is described here by way of example. The ring half 18a has in this exemplary embodiment a spherical external contour. The connection structures 22 which are in the form of engagement elements here are arranged in the region of the abutment location with respect to the other ring half 18b. In this case, the engagement elements 22 extend in an axial direction so that the two ring halves 18a, 18b can be connected to each other by an axial movement. On the engagement elements 22, snap-fit connections 62 are formed. In an assembled position of the two ring halves 18a, 18b, they are fixed relative to each other via the snap-fit connection 62 so that an axial release of the two ring halves 18a, 18b is made more difficult.

Figure 4:
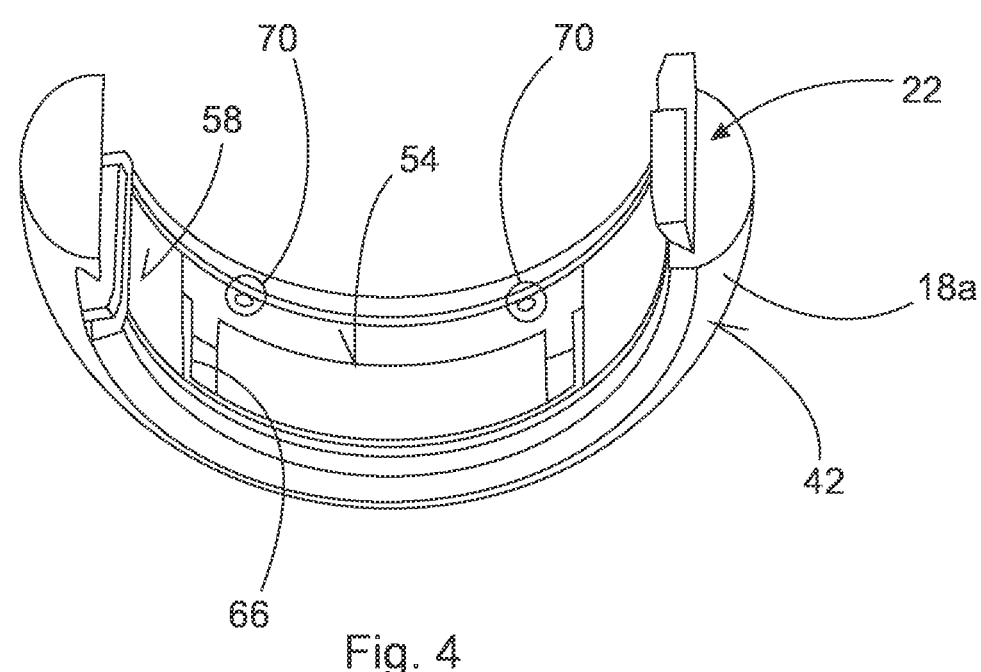
FIG. 4 is a perspective view of a ring half of the wear ring without any ring insert, in accordance with the disclosure.

FIG. 4 shows an additional illustration of the ring half 18a of the wear ring 10 without any ring insert 26. In the illustration shown here, the indentation 54 can clearly be seen in the ring half 18a for the ring insert 26. There are also formed in the ring half 18a two openings 66, in which the extensions 38 of the ring insert 26 are arranged. The indentation 54 in the ring half 18a further has structures 70, with which the ring insert 26 is retained in a delivery position. The ring insert 26 is thereby prevented from falling inwardly. These structures 70 are in the form of knobs in this exemplary embodiment. In the exemplary embodiment shown here, the knobs project in an axial direction into the indentation 54. At a side axially opposite the side shown here, knobs 70 which are not illustrated here are arranged. The ring insert 26 is clamped in the delivery position via both knob pairs.

Figure 5:
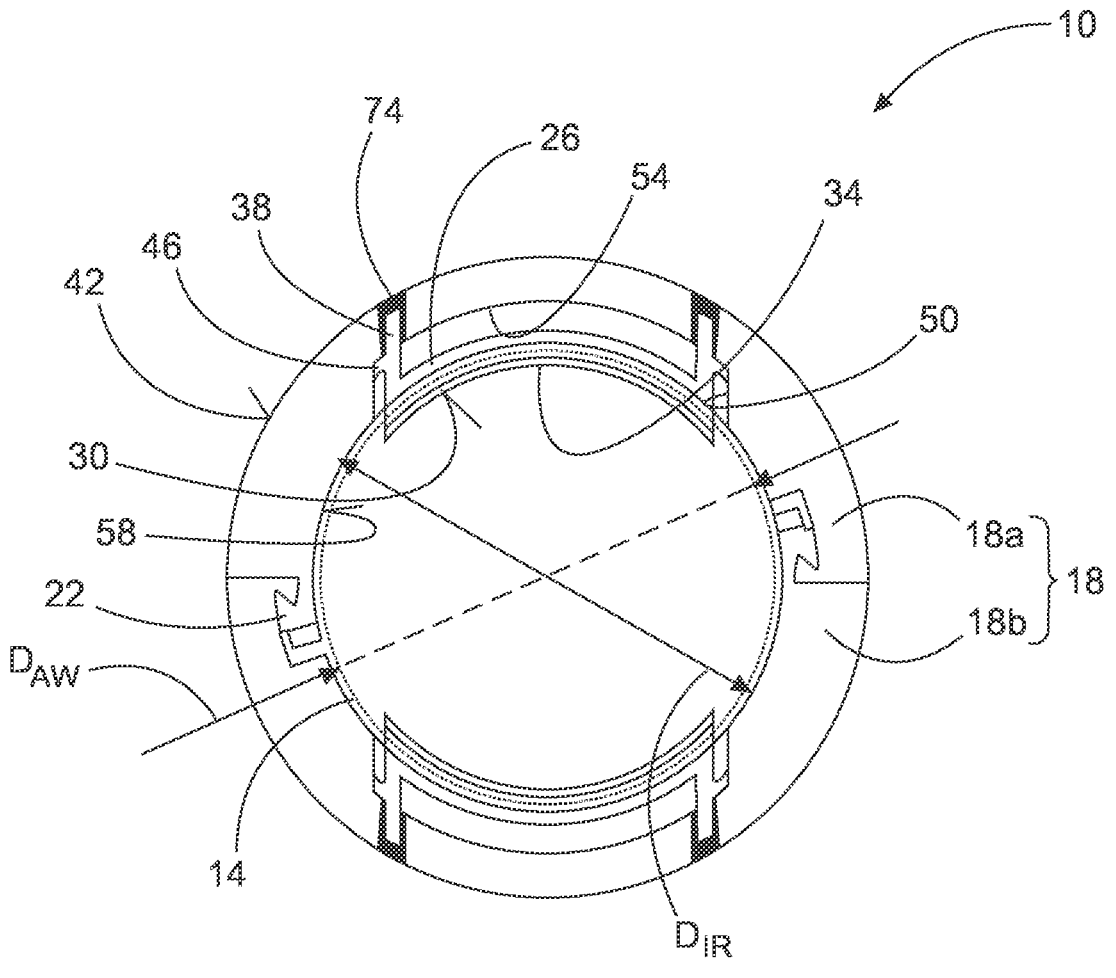
FIG. 5 is a sectioned view of an additional exemplary embodiment of a wear ring in a fixed position with closure caps, in accordance with the disclosure.

FIG. 5 shows a sectioned view of an additional exemplary embodiment of a wear ring 10 in a fixed position. Unlike the exemplary embodiment from FIG. 1, the extensions 38 do not terminate in a fixed position flush with the outer side 42 of the ring 18. In this exemplary embodiment, the extensions 38 terminate in the fixed position in the region of the ring 18. Additionally, closure caps 74 are arranged on the extensions 38 in this exemplary embodiment. These closure caps 74 form with the outer side 42 a continuous face. In this exemplary embodiment, the closure caps 74 are configured in a different color from the ring 18. It is thereby simple for the user to identify whether the ring 18 is located in a fixed position.

Preferably, the wear ring has two ring inserts which are opposite each other. This has the advantage that the ability of the wear ring to be retained on the corrugated pipe is increased. Furthermore, the corrugated pipe is clamped by the ring inserts uniformly.

In a preferred embodiment, the ring insert is arranged on the ring half in an exchangeable manner. The ring insert can thereby be changed for a ring insert with a different contour at the inner side. It is thereby possible to adapt the contour to the used corrugated pipe, cable, etc. The wear ring can thereby be used for different surfaces so that the wear ring can be used in a versatile manner. Since only the ring insert has to be changed, the number of different parts which have to be kept in store for the different corrugated pipes, cables, etc., is substantially reduced.

In another preferred embodiment, the ring halves have structures, with which the ring insert is retained in a delivery position. In this instance, the delivery position is a position in which the ring insert is in a radially internal position. This position substantially corresponds to the fixed position. In this position, however, the ring is not fixed to the corrugated pipe. In this case, the structures may be constructed in such a manner that a clamping force is applied to the ring insert. The ring inserts are thereby prevented from falling out of the ring halves during transport. Consequently, the ring halves can already be delivered with pre-assembled ring inserts so that the number of individual parts is reduced. The handling of the wear ring is thereby simplified.

Preferably, for axially connecting the ring halves, the connection structures have a snap-fit connection, via which the ring halves are fixed in a connected position in the axial direction relative to each other. In an assembled position of the ring halves, the snap-fit connection is locked. The ring halves consequently cannot be displaced relative to each other anymore. A correct assembly position, which is indicated haptically by the snap-fit movement for a user, of the ring halves relative to each other is thereby automatically achieved. Additionally, the ring which is formed from the ring halves cannot be displaced or fall apart during an axial movement on the corrugated pipe. Using the wear ring is thereby simplified.

In an advantageous further development, the ring insert is arranged in a pre-assembly position in an internal indentation of the ring half. As a result of being received in the indentation, it is possible to select a minimal internal diameter for the ring. The wear ring is thereby no larger than a conventionally used wear ring. This has the advantage that the wear ring can be configured to be small.

Preferably, the ring insert in the pre-assembly position is completely arranged inside the indentation so that the ring insert does not project beyond an inner side of the ring. This additionally has the advantage that possible ribs, which are formed on the ring insert, do not impede an axial movement of the wear ring on the corrugated pipe. Since the inner side of the ring is preferably constructed to be smooth, the wear ring can be moved without resistance over an outer side of the corrugated pipe in an axial direction. The positioning of the wear ring is thereby substantially simplified.

Advantageously, the ring insert has extensions which project over a radial outer side of the ring half in a pre-assembly position. The extensions preferably extend in the radial movement direction of the ring insert. As a result of the extensions, the ring insert can be brought from an outer side of the ring into a fixed position. The fixing of the wear ring is thereby simplified for a user.

In another advantageous embodiment, the extensions have locking projections which are engaged with the ring half in a fixed position of the ring. Locking projections are simple structures in order to lock the fixed position of the ring inserts without additional securing structures. Furthermore, locking projections have the advantage that they can be released again by moving the locking projection counter to an engaging direction. It is thereby possible to produce a releasable connection so that the wear ring can be displaced again where necessary.

According to an advantageous embodiment, in the fixed position of the ring closure caps can be applied to the extensions. In this instance, the closure caps cover the extensions in a fixed position on the corrugated pipe. An optical control of a fixed position is thereby readily possible. Preferably, the closure caps are configured in a different color. As a result of the different color, the closure caps are even more clearly visible to a user so that a fixed position of the wear ring can be optically established in a simple manner.

According to another advantageous embodiment, the ring halves are constructed identically. An identical construction of the ring halves has the advantage that for both ring halves the same production process and the same injection-molding mold can be used. The production is thereby simplified and can be carried out economically. Similarly, it is not possible for the user to transpose pieces. The use of the wear ring is thereby simpler for the user and more reliable. In a particularly preferable manner, the ring inserts are also constructed identically.

Preferably, the ring insert is fixed on the corrugated pipe in a positive-locking or non-positive-locking manner. The ring insert can be arranged in the ring halves particularly in a changeable manner. It is thereby possible to use a ring insert, the internal surface of which is constructed for a positive-locking connection to ribs. Consequently, therefore, a high ability for retention on the corrugated pipe, for example, can be achieved. Since particularly, for example, cables have no structured surface, a good ability for retention can also be achieved with a non-positive-locking connection on such a surface. In components, such as, for example, over-extruded corrugated pipes, a positive-locking connection would result in destruction of the surface. Therefore, a non-positive-locking connection is used for it. The wear ring can thereby be used for different pipes, hoses, or cables so that a high ability of the wear ring to be used is possible.

In an advantageous further development, the ring insert and the ring halves are made from a plastics material. The ring insert and the ring halves can thereby be produced in a simple and cost-effective manner. For example, these components can be produced by way of injection-molding. Plastics material further has the advantage that it is light-weight so that the wear ring does not unnecessarily make, for example, the corrugated pipe heavier. Furthermore, the structure is not damaged by the plastics material. Preferably, the ring insert and the ring halves comprise the same plastics material so that the wear ring can be produced economically.

LIST OF REFERENCE NUMERALS

10 Wear ring
14 Corrugated pipe
18 Ring
18a Ring half
18b Ring half
22 Connection structures/engagement element
26 Ring insert/securing structure
30 Internal surface
34 Rib structure
38 Extension
42 Outer side
46 Locking projection
50 Recess
54 Indentation
58 Inner side
62 Snap-fit connection
66 Opening
70 Structures/knobs
74 Closure cap
$D_{IR}$ Internal diameter of ring
$D_{AW}$ External diameter of corrugated pipe All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wear ring for fitting to a corrugated pipe, comprising:
two ring halves, the two ring halves being connectable to one another to form a ring; and
a securing structure arranged on the two ring halves, the securing structure being adapted to attach the ring to the corrugated pipe;
wherein the ring halves have connection structures that are configured to be connected to each other via a direct mechanical engagement in an axial direction perpendicular to a radial direction of the ring halves, wherein the securing structure is formed by at least one ring insert which is radially movable in the radial direction on the ring and which can be locked in order to fix the ring to the corrugated pipe in a radially internal position on the ring.

2. The wear ring as claimed in claim 1, wherein the at least one ring insert is arranged on one of the two ring halves in an exchangeable manner.

3. The wear ring as claimed in claim 1, wherein the ring halves have additional structures with which the at least one ring insert is retained in a delivery position.

4. The wear ring as claimed in claim 1, wherein the direct mechanical engagement is a positive-locking engagement, and wherein for axially connecting the ring halves, the connection structures have a snap-fit connection via which the ring halves are fixed in a connected position in the axial direction relative to each other.

5. The wear ring as claimed in claim 1, wherein the at least one ring insert is arranged in a pre-assembly position in an internal indentation of one of the two ring halves.

6. The wear ring as claimed in claim 1, wherein the at least one ring insert includes extensions that project over a radial outer side of one of the two ring halves in a pre-assembly position.

7. The wear ring as claimed in claim 6, wherein the extensions have locking projections that are engaged with the ring half in a fixed position of the ring.

8. The wear ring as claimed in claim 7, wherein, in the fixed position of the ring, closure caps can be applied to the extensions.

9. The wear ring as claimed in claim 1, wherein the ring halves are constructed identically.

10. The wear ring as claimed in claim 1, wherein the at least one ring insert is adapted to be fixed on the corrugated pipe in a positive-locking or non-positive-locking manner.

11. The wear ring as claimed in claim 1, wherein the at least one ring insert and the ring halves are made from a plastics material.

12. The wear ring as claimed in claim 1, wherein the connection structures comprise interlocking snap-fit engagement elements, and wherein the snap-fit engagement elements are configured to deform perpendicularly to the radial direction when connected in the axial direction.

13. The wear ring as claimed in claim 1, wherein the ring halves comprise the connection structures.

14. The wear ring as claimed in claim 1, wherein the ring halves are configured to provide a larger inner diameter than the securing structure when the securing structure is locked.

15. A wear ring for fitting to a corrugated pipe, comprising:
two ring halves, the two ring halves being connectable to one another to form a ring; and
a securing structure arranged on the two ring halves, the securing structure being adapted to attach the ring to the corrugated pipe;
wherein the ring halves have connection structures that are configured to be connected to each other in a positive-locking manner in an axial direction, wherein the securing structure is formed by at least one ring insert which is radially movable on the ring and which can be locked in order to fix the ring to the corrugated pipe in a radially internal position on the ring,
wherein the at least one ring insert includes extensions that project over a radial outer side of one of the two ring halves in a pre-assembly position,
wherein the extensions have locking projections that are engaged with the ring half in a fixed position of the ring, and
wherein, in the fixed position of the ring, closure caps can be applied to the extensions.

* * * * *